US010518775B1

(12) United States Patent
Velazquez Alcantar et al.

(10) Patent No.: US 10,518,775 B1
(45) Date of Patent: Dec. 31, 2019

(54) REGENERATIVE BRAKING OF VEHICLE WITH PRIMARY AND SECONDARY DRIVE AXLES

(71) Applicant: Ford Global Technologies, LLC, Dearborn, MI (US)

(72) Inventors: Jose Velazquez Alcantar, Canton, MI (US); Corwin Stout, Ann Arbor, MI (US); Rajit Johri, Canton, MI (US); Joseph Jay Torres, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/129,964

(22) Filed: Sep. 13, 2018

(51) Int. Cl.
| B60W 30/18 | (2012.01) |
| B60W 10/08 | (2006.01) |
| B60W 20/14 | (2016.01) |
| B60L 15/20 | (2006.01) |
| B60L 50/13 | (2019.01) |

(52) U.S. Cl.
CPC ... B60W 30/18127 (2013.01); B60L 15/2045 (2013.01); B60L 50/13 (2019.02); B60W 10/08 (2013.01); B60W 20/14 (2016.01); B60W 30/18172 (2013.01); B60L 2240/423 (2013.01); B60W 2520/105 (2013.01); B60W 2520/14 (2013.01); B60W 2520/263 (2013.01); B60W 2520/28 (2013.01); B60W 2720/403 (2013.01)

(58) Field of Classification Search
CPC ..................................................... B60W 20/14
USPC ........................................ 318/376, 375, 362
See application file for complete search history.

(56) References Cited

U.S. PATENT DOCUMENTS

| 8,453,770 | B2* | 6/2013 | Tang | B60L 15/2036 |
| | | | | 180/65.1 |
| 8,618,752 | B2* | 12/2013 | Zing | B60L 15/2045 |
| | | | | 318/8 |
| 8,725,335 | B2 | 5/2014 | Tolkacz et al. | |
| 9,162,730 | B2* | 10/2015 | Tanaka | H02P 6/085 |
| 2016/0121883 | A1 | 5/2016 | Mao et al. | |

* cited by examiner

*Primary Examiner* — David Luo
(74) *Attorney, Agent, or Firm* — David Kelley; Brooks Kushman, P.C.

(57) ABSTRACT

A vehicle includes primary and secondary axles including primary and secondary electric machines, respectively. A vehicle controller is programmed to, responsive to a braking torque request, command regenerative torques, that are a proportion of the braking torque request, to the electric machines such that the proportion commanded to the secondary electric machine decreases responsive to lateral acceleration of the vehicle increasing.

19 Claims, 3 Drawing Sheets

REGENERATIVE BRAKING OF VEHICLE WITH PRIMARY AND SECONDARY DRIVE AXLES

TECHNICAL FIELD

This disclosure relates to electrified vehicles that include primary and secondary drive axles powered by at least primary and secondary electric machines, and more specifically to splitting regenerative braking torque between the primary and secondary electric machines based on efficiency of the electric machines and/or vehicle stability.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power.

SUMMARY

According to one embodiment, a vehicle includes primary and secondary axles including primary and secondary electric machines, respectively. A vehicle controller is programmed to, responsive to a braking torque request, command regenerative torques, that are a proportion of the braking torque request, to the electric machines such that the proportion commanded to the secondary electric machine decreases responsive to lateral acceleration of the vehicle increasing.

According to another embodiment, a vehicle includes primary and secondary drive axles and a controller. The controller is programmed to, responsive to a braking torque request, (i) command a regenerative torque to the secondary axle that is derived from the braking torque request, a base-split modifier, and an efficiency modifier and (ii) command a regenerative torque to the primary axle that is derived from the braking torque and the regenerative torque to the secondary electric axle.

According to yet another embodiment, a vehicle includes primary and secondary axles including primary and secondary electric machines, respectively. A vehicle controller is programmed to, responsive to a braking torque request, command regenerative torques, that are a proportion of the braking torque request, to the electric machines such that the proportion commanded to the secondary electric machine decreases responsive to longitudinal acceleration of the vehicle increasing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
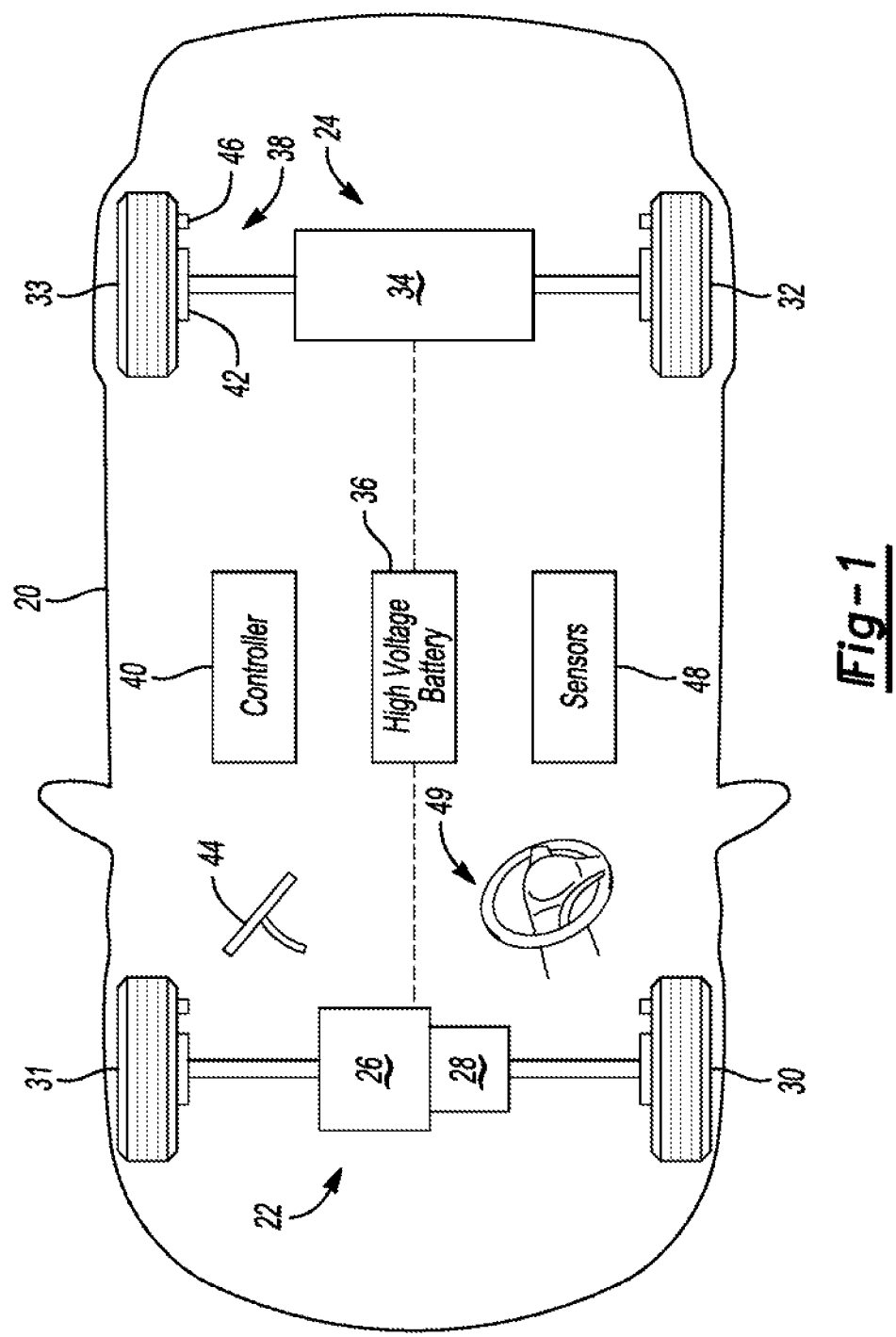
FIG. 1 is a diagrammatical view of a hybrid vehicle having primary and secondary drive axles.

Referring to FIG. 1, an electrified vehicle 20 is illustrated as a hybrid-electric vehicle that includes an internal-combustion engine, but, in other embodiments, the electrified vehicle 20 may be a fully electric vehicle. The vehicle 20 may include a primary drive axle 22 and a secondary drive axle 24. In the illustrated embodiment, the primary drive axle 22 is the front axle and the secondary drive axle 24 is the rear axle. In other embodiments, the rear axle may be the primary drive and the front axle may be the secondary drive. The primary and secondary axles each include their own powerplant, e.g., engine and/or electric machine, and are capable of operating independently of each other or in tandem to accelerate (propel) or decelerate (brake) the vehicle 20.

The primary drive axle 22 may include an internal-combustion engine 26 and an electric machine 28 operable to power the primary wheels 30 and 31. The engine 26 and the electric machine 28 may operate in tandem or independently depending upon operating conditions of the vehicle. A gearbox (not shown) may be included to change a speed ratio between the wheels 30, 31 and the powerplants. The secondary drive axle 24 may include an electric machine 34 that is operably coupled to the wheels 32 and 33. A gearbox (not shown) may be included change a speed ratio between the electric machine 34 and the wheels 32, 33.

The primary and secondary electric machines 28, 34 are capable of acting as motors to propel the vehicle 20 and are capable of acting as generators to brake the vehicle via regenerative braking. The primary and secondary electric machines 28, 34 may be permanent magnet synchronous alternating current (AC) machines.

The primary and secondary electric machines 28, 34 are powered by a traction battery 36. The traction battery 36 stores energy that can be used by the electric machines 28, 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, a typical traction battery 36 may provide a DC voltage while the electric machines 28, 34 may require a three-phase AC voltage to function. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

The vehicle 20 includes a controller 40 that is in electronic communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, a reference to "a controller" refers to one or more controllers. The controller 40 may include battery energy control module (BECM) that operates at least the traction battery, an engine control module (ECM) that operates at least the engine, a powertrain control module (PCM) that operates at least the electric machines and the gearboxes, and an ABS control module that controls the anti-lock braking system (ABS) 38.

The ABS 38, while illustrated as a hydraulic system, may be electronic or a combination of electronic and a hydraulic. The ABS 38 may include a brake module and a plurality of friction brakes 42 located at each of the wheels. Modern vehicles typically have disc brakes; however, other types of friction brakes are available such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes speed sensors 46 each located on one of the wheels.

The vehicle 20 is configured to decelerate using regenerative braking, friction braking, or a combination thereof. The controller 40 includes programming for aggregating a demanded braking torque between regenerative braking, i.e., the electric machines, and the friction brakes 42. The demanded braking torque may be based on driver input, e.g., a position of the brake pedal 44, or by the controller 40. The aggregator of the controller 40 may be programmed to decelerate the vehicle using regenerative braking whenever possible and apply the friction brakes 42 only when needed.

The vehicle 20 may include one or more sensors 48 configured to determine accelerations of the vehicle. For example, the sensors 48 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 40. In some embodiments, the yaw rate, lateral acceleration, longitudinal acceleration, and other measurements may be measured by a single sensor.

The vehicle 20 may also include a steering system 49 that turns the primary wheels 30, 31. The steering system 49 may include a steering wheel connected to a steering shaft that actuates a steering box, such as a rack-and-pinion assembly. The steering box is operably coupled to the primary wheels 30, 32 and turns the wheels according to inputs from the steering wheel. The steering system 49 may include one or more sensors configured to output a signal indicative of steering angle to the controller 40. The steering sensor may measure rotation of the steering shaft.

Unlike conventional electric vehicles that only include a single powertrain, the vehicle 20 can divide the regenerative braking torque between the primary axle 22 and the secondary axle 24. This allows the vehicle 20 to capture more energy during regenerative braking and increase vehicle stability as compared to other electric powertrains.

Figure 2:
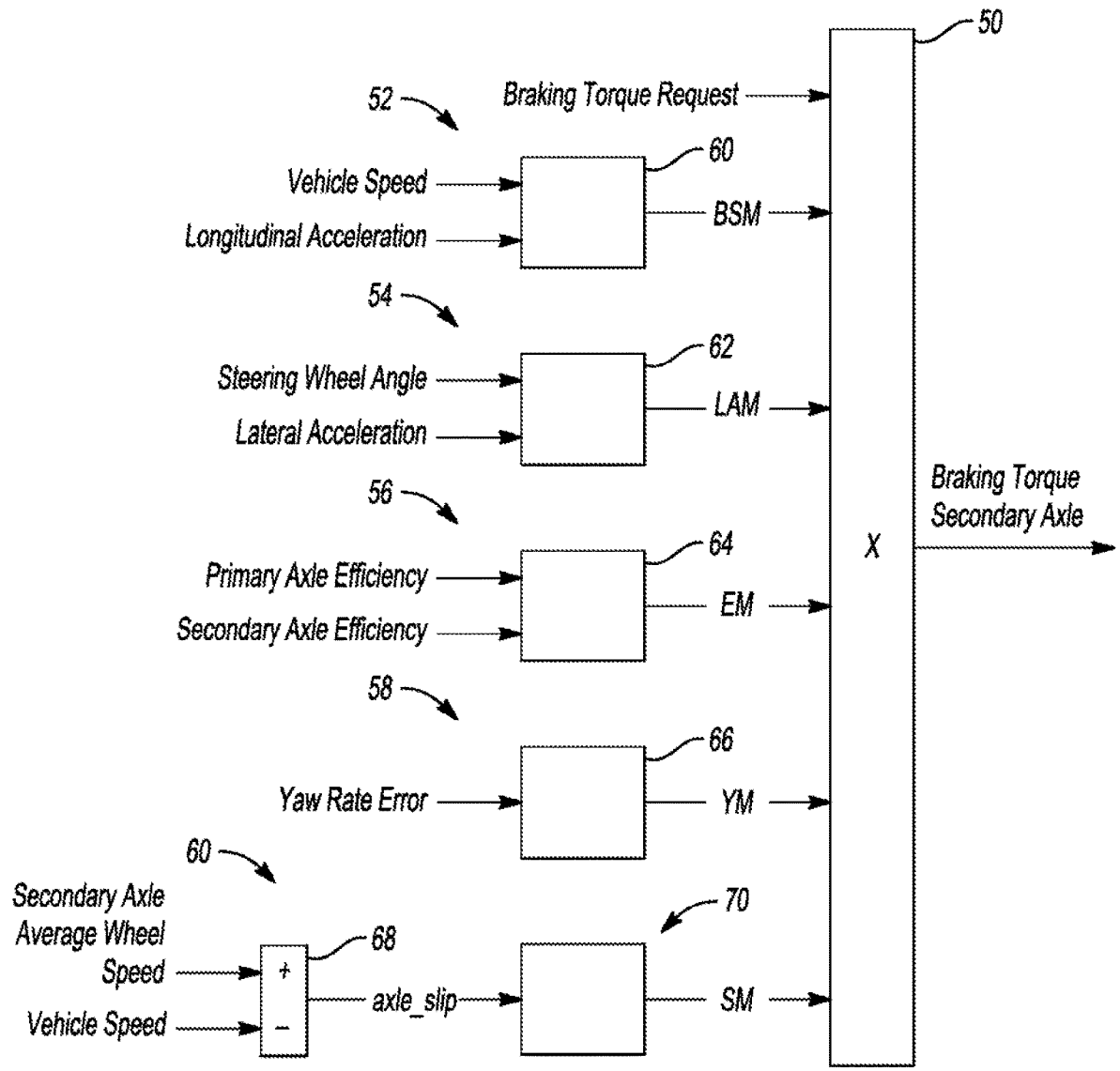
FIG. 2 is a control diagram for controlling regenerative braking split between the primary and secondary axles of the vehicle according to one embodiment.
Figure 3:
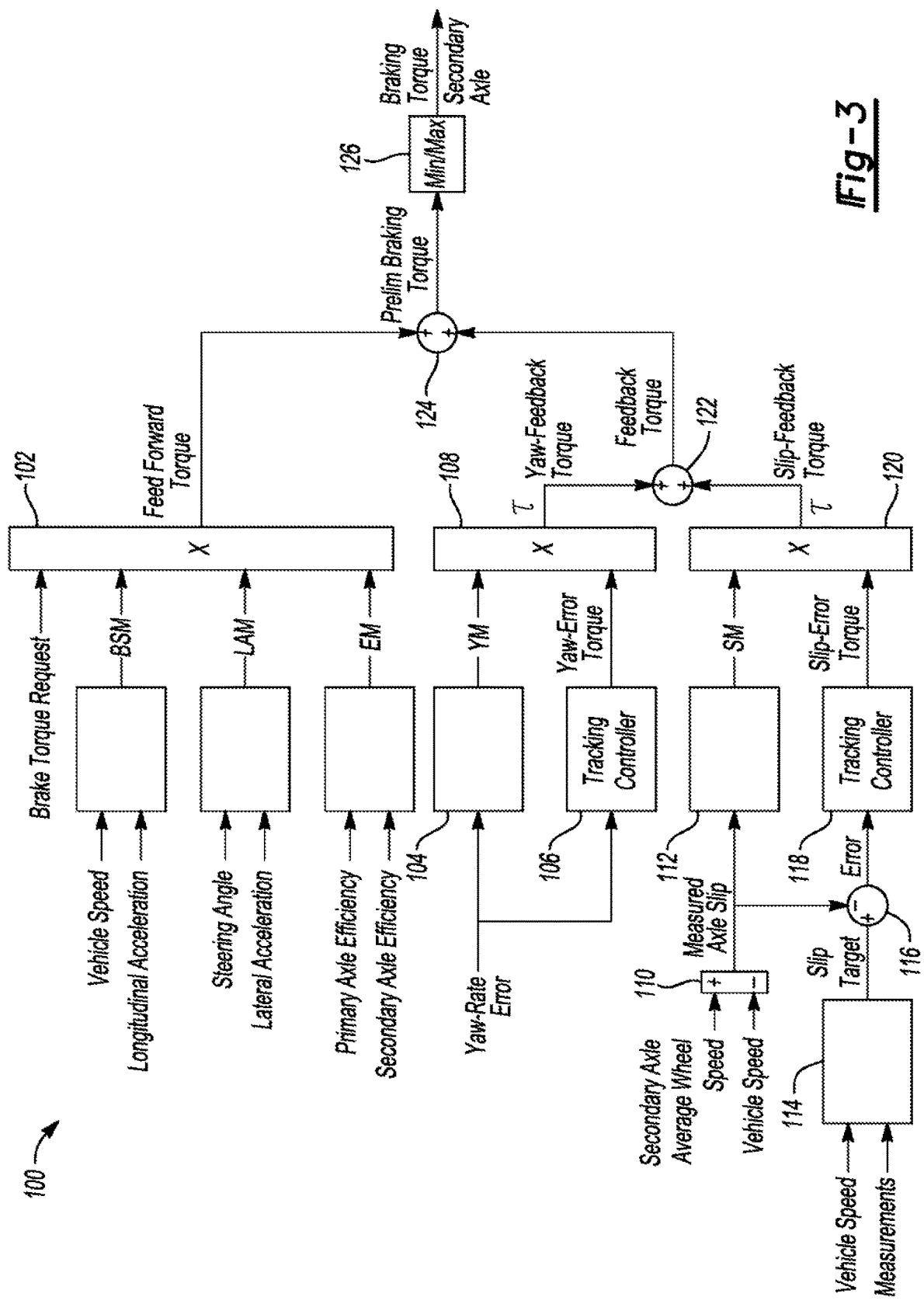
FIG. 3 is a control diagram for controlling regenerative braking split between the primary and secondary axles of the vehicle according to another embodiment.

FIGS. 2 and 3 illustrate control diagrams for determining a regenerative braking torque split between the primary and secondary drive axles 22, 24. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Referring to FIG. 2, the controls begin in response to a braking torque request. The braking torque request may be generated by the driver via the brake pedal 44 or by the controller 40. The controller 40 is configured to determine a proportion of the brake torque to the primary drive axle 22 and the secondary drive axle 24. The proportion of the brake torque to the primary drive axle can be calculated using equation 1: braking torque primary axle=braking torque request−braking torque secondary axle. In the illustrated embodiments, the controller 40 is programmed to calculate the braking torque secondary axle and to derive the braking torque primary axle using equation 1. In other embodiments, the controller may be programmed to calculate the braking torque primary axle and to derive the braking torque secondary axle using a modified version of equation 1.

The brake torque is sent to a secondary axle torque proportion module generally denoted by box 50. The module 50 determines the proportion of the brake torque to be provided by the secondary drive axle 24, i.e., braking torque secondary axle. The module 50 may calculate a commanded secondary axle brake torque by modifying the received brake torque request by a base-split modifier (BSM) 52, a lateral acceleration modifier (LAM) 54, efficiency modifier (EM) 56, a yaw modifier (YM) 58, and/or the slip modifier (SM) 60. The commanded braking torque secondary axle may be calculated using equation 2: braking torque secondary axle=braking torque request×BSM×LAM×EM×YM×SM. Each of the modifiers can have a value between zero and one. When the modifier has a value of one, the modifier does not affect the torque commanded to the secondary drive axle 24, and if any of the modifiers has a value of zero, no torque is commanded to the secondary drive axle 24.

The controller 40 may be programmed to determine the base-split modifier 52 based on vehicle speed and longitudinal acceleration of the vehicle 20. A plurality of base-split values may be stored in a lookup table 61, which may be a 3D lookup table. The lookup table 61 includes values of the base-split modifier 52 for a sensed vehicle speed and longitudinal acceleration. The longitudinal acceleration of the vehicle may be measured by the at least one sensor 48. In the illustrated embodiment, the base-split modifier 52 decreases responsive to an absolute value of longitudinal acceleration increasing. For a given longitudinal acceleration, the base-split modifier 52 may also decrease responsive to vehicle speed increasing.

The controller 40 may also be programmed to determine the lateral-acceleration modifier 54 based on a steering angle of the steering system 49 and lateral acceleration of the vehicle. The lateral acceleration may be measured by the at least one sensor 48. A plurality of lateral-acceleration modifier values may be stored in a lookup table 62. The lookup table 62 includes values of the modifier 54 for a sensed steering angle and lateral acceleration. In the illustrated embodiment, the lateral-acceleration modifier 54 decreases in response to lateral acceleration increasing and/or steering angle increasing.

The commanded regenerative torque of the second electric machine is also modified by an efficiency modifier 56. The efficiency modifier 56 shifts the proportion of the regenerative torque between the primary and secondary electric machines 28, 34 based on the efficiencies of the electric machines at current operating conditions. While electric machines are typically capable of generating electrical power over a large range of torques and speeds, the efficiency of power generation varies. During calibration, electric machines are benchmarked to generate efficiency maps that identify operating envelopes in which electrical power is produced with greater or less efficiency. The efficiency modifier 56 is used by the controller 40 to determine which of the primary and secondary electric machines should perform a majority of the regenerative braking in order to generate more electrical power from a given amount of kinetic energy.

The efficiency maps 64 of the primary and secondary electric machines 28, 34 are stored in memory of the controller 40.

The motor efficiencies can be stored as multiple 3D lookup tables that are a function motor speed, torque, battery voltage, motor temperature, etc. The output of these tables is a value of efficiency for each axle. We can then take a ratio of the secondary and primary efficiency, e.g., efficiency ratio (Eff_ratio)=secondary axle efficiency/primary axle efficiency. If Eff_ratio=1, both axles are equally efficient so the current split is maintained, i.e., efficiency modifier=1. If Eff_ratio=0: the secondary axle has 0% efficiency so send all torque to the primary axle, i.e., efficiency modifier=0

The efficiency modifier may be weighted with respect to the other modifiers. For example, a stability event will take precedence over the efficiency modifier. One way to do this is to make the minimum value of the efficiency modifier a non-zero calibratable value. This limits the amount of torque that the efficiency modifier can take away from the secondary axle, which prevents the efficiency modifier from removing all torque to the secondary axle if there is a stability event in which torque to the secondary axle is need to increase stability.

The controller 40 may further be programmed to determine the yaw-rate modifier 58 based on a yaw-rate error. The controller 40 may be programmed to determine a target yaw rate based on operating conditions of the vehicle, for example, as sensed by the at least one sensor 48. The yaw-rate error is calculated by subtracting a measured yaw rate from the target yaw rate. The controller 40 may include a lookup table 66 that coordinates yaw-rate error to yaw-rate modifier values. For example, if the yaw-rate error is positive the vehicle 20 is in an understeer condition and the modifier 58 is 1 as an understeer condition is stable. Conversely, if the yaw-rate error is negative, the vehicle is in an oversteer condition, which if severe, can cause instability of the vehicle. Thus, the lookup table 66 may include modifier values less than 1 for negative error rates to reduce braking torque to the secondary axle 24. The values of the modifier 58 may decrease responsive to increasing yaw-rate errors in the negative direction.

The slip modifier 60 reduces the secondary brake torque based on wheel slip of the secondary wheels 32, 33. The controller 40 may be programmed to receive a sensed average wheel speed of the secondary wheels and a vehicle speed at box 68. In box 68, the axle slip may be calculated using equation 3: Slip=Rω−Vehicle Speed, where ω is the average wheel speed of the axle and R is wheel radius. The calculated slip of equation 3 is then fed to a lookup table 70 to determine the corresponding slip modifier 60. In one embodiment, the slip modifier 60 reduces as the absolute value of slip increases to reduce the likelihood of the secondary wheels 32, 33 from skidding.

The regenerative braking request and the modifiers 52-68 are fed into box 50 which outputs a torque command for the secondary axle 24 (braking torque secondary axle). The controller 40 may then calculate the torque command for the primary axle 22 (braking torque primary axle) using equation 1. The torque commands for the primary and secondary axles 22, 24 are then fed to the braking aggregator module which determines the braking duties between the regenerative braking system and the friction brakes based on operating conditions. The aggregator then outputs regenerative braking commands for the primary and secondary axles to another control module, e.g., powertrain control module, that determines and commands the appropriate regenerative torques to the electric machines to regeneratively brake the vehicle 20.

FIG. 3 illustrates controls 100 according to an alternative embodiment that includes both feedforward and feedback controls. Similar to the controls of FIG. 2, the brake torque request, the base-split modifier, the lateral acceleration modifier, and the efficiency modifier are fed into box 102 which outputs a feedforward torque of the secondary axle.

The controls of FIG. 3 also include a feedback portion that outputs a feedback torque of the secondary axle based on vehicle yaw and average wheel slip of the secondary axle 24. The controls 100 include a lookup table 104 for determining a yaw modifier based on yaw-rate error. The yaw modifier has a value between 0 and 1, and the modifier is less than one when the vehicle is in an understeer condition and is 1 when the vehicle is in an oversteer condition. The yaw-rate error may be calculated as described above. The yaw-rate error is also feed to a tracking controller 106, e.g., a proportion-integral (PI) controller, that determines a yaw-error torque of the secondary axle 24 needed to reduce the yaw-rate error. The yaw-error torque and the yaw modifier are feed to box 108 that outputs a yaw-feedback torque by multiplying the yaw-error torque by the yaw modifier.

The controls 100 also include a torque correction for slip of the wheels 32, 33. Vehicle speed and an average wheel speed of the secondary axle are feed into box 110 that determines a measured wheel slip as described above. A lookup table 112 correlates the measured wheel slip to a slip modifier like lookup table 70 except the slip modifier in the feedback version is the inverse of the feedforward version. The measured wheel slip is also used to calculate a slip-error torque.

The controls 100 include a lookup table 114 that outputs a slip target based on vehicle speed and other measures, e.g., longitudinal acceleration and lateral acceleration. The slip target and the measured slip are passed to operand 116 to determine the slip error. The slip error is feed to tracking controller 118 that determines a slip-error torque of the secondary axle 24 needed to reduce the slip error. The slip-error torque and the slip modifier are feed to box 120, which multiplies the slip-error torque and the slip modifier to generate a slip-feedback torque.

The yaw-feedback torque and the slip-feedback torque are added at operand 122 to calculate a feedback torque. The feedback torque and the feedforward torque are added at operand 124 to determine a preliminary braking torque for the secondary axle 24. Typically, the feedback torque is zero or a positive value, which reduces the feedforward torque (which is typically negative). It is possible, however, for the feedback torque to be negative. The controls 100 may include a minimum/maximum box 126 that clips the preliminary torque if it is outside of minimum and maximum limits. The maximum torque limit may be zero and the minimum torque limit may be the braking torque request. The box 126 outs the final torque for the secondary axle 24 (braking torque secondary axle).

The braking torque for the primary axle 22 (braking torque primary axle) may then be calculated using equation 1. The braking torques are then send to other control modules to effectuate regenerate braking with the electric machines as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   primary and secondary axles including primary and secondary electric machines, respectively; and
   a controller programmed to, responsive to a braking torque request, command regenerative torques, that are a proportion of the braking torque request, to the electric machines such that the proportion commanded to the secondary electric machine decreases responsive to lateral acceleration of the vehicle increasing.

2. The vehicle of claim 1, wherein the proportion commanded to the secondary electric machine further decreases responsive to efficiency of the secondary electric machine decreasing.

3. The vehicle of claim 1, wherein the proportion commanded to the secondary electric machine further decreases responsive to a yaw-rate error decreasing.

4. The vehicle of claim 1, wherein the secondary axle includes wheels, and wherein the proportion commanded to the secondary electric machine further decreases responsive to slip of the wheels increasing.

5. The vehicle of claim 1, wherein the proportion commanded to the secondary electric machine further decreases responsive to longitudinal acceleration of the vehicle increasing.

6. The vehicle of claim 5, wherein, for a given longitudinal acceleration of the vehicle, the proportion commanded to the secondary electric machine decreases as vehicle speed increases and the proportion commanded to the secondary electric machine increases as the vehicle speed decreases.

7. The vehicle of claim 1, wherein the proportion commanded to the secondary electric machine further decreases responsive to steering angle increasing.

8. The vehicle of claim 1, wherein the primary axle is a front axle and the secondary axle is a rear axle.

9. A vehicle comprising:
   primary and secondary drive axles; and
   a controller programmed to, responsive to a braking torque request, (i) command a regenerative torque to the secondary axle that is derived from the braking torque request, a base-split modifier, and an efficiency modifier, wherein the base-split modifier is based on vehicle speed and longitudinal acceleration of the vehicle, and (ii) command a regenerative torque to the primary axle that is derived from the braking torque and the regenerative torque to the secondary electric axle.

10. The vehicle of claim 9, wherein each of the primary and secondary drive axles includes an electric machine.

11. The vehicle of claim 10, wherein the braking torque request is multiplied by a yaw modifier.

12. The vehicle of claim 9, wherein the braking torque request is further multiplied by a lateral-acceleration modifier having a value between 0 and 1 and wherein the lateral-acceleration modifier decreases responsive to lateral acceleration of the vehicle increasing.

13. A vehicle comprising:
primary and secondary axles including primary and secondary electric machines, respectively; and
a controller programmed to, responsive to a braking torque request, command regenerative torques, that are a proportion of the braking torque request, to the electric machines such that the proportion commanded to the secondary electric machine decreases responsive to longitudinal acceleration of the vehicle increasing.

14. The vehicle of claim 13, wherein for a given longitudinal acceleration of the vehicle, the proportion commanded to the secondary electric machine decreases as vehicle speed increases, and the proportion commanded to the secondary electric machine increases as the vehicle speed decreases.

15. The vehicle of claim 13, wherein the proportion commanded to the secondary electric machine further decreases responsive to efficiency of the secondary electric machine decreasing.

16. The vehicle of claim 13, wherein the proportion commanded to the secondary electric machine further decreases responsive to a yaw rate error decreasing.

17. The vehicle of claim 13, wherein the secondary axle includes wheels and wherein the proportion commanded to the secondary electric machine further decreases responsive to slip of the wheels increasing.

18. The vehicle of claim 13, wherein the proportion commanded to the secondary electric machine further decreases responsive to lateral acceleration of the vehicle increasing.

19. The vehicle of claim 13, wherein the primary axle is a front axle and the secondary axle is a rear axle.

* * * * *